United States Patent Office 3,202,534
Patented Aug. 24, 1965

3,202,534
PROCESS AND COMPOSITION FOR THE AFTER-TREATMENT OF PHOSPHATE COATINGS
Eduard Duch, Frankfurt am Main, Willy Herbst, Hofheim, Taunus, Fritz Rochlitz and Hans Scherer, Frankfurt am Main, and Herbert Vilcsek, Hofheim, Taunus, Germany, assignors to Farbwerke Hoechst Aktiengesellschaft vormals Meister Lucius & Brüning, Frankfurt am Main, Germany, a corporation of Germany
No Drawing. Filed Aug. 28, 1961, Ser. No. 134,115
Claims priority, application Germany, Aug. 30, 1960, F 31,999
7 Claims. (Cl. 117—75)

The present invention provides a process and composition for the after-treatment of phosphatized metal surfaces in order to improve their protection against corrosion. The invention is particularly directed to the after-treatment of phosphatized metal surfaces by contacting said metal surfaces with solutions containing mixtures of alkene phosphonic acids and macromolecular substances of vinyl phosphonic acid and/or derivatives thereof and/or polymers free from phosphorus which contain acid groups, and subsequently drying the metal surfaces thus treated.

The phosphatizing processes that have been used for decades to inhibit the corrosion of iron and steel surfaces result in phosphate coatings which, because of their porosity, give in many cases insufficient protection of the metal. In order to attain an effective corrosion protection, the phosphatizing process is, therefore, often followed by rinsing with dilute aqueous chromic acid. The chromic acid which penetrates into the pores of the phosphate coating during this rinsing procedure improves the protective value of these coatings.

This after-treatment has the disadvantage that it necessitates treatment of the waste water. Because of the considerable toxicity of compounds of hexavalent and trivalent chromium, they must be removed almost quantitatively from the waste water and this entails considerable expense. Moreover, the chromic acid concentrates used for preparing and replenishing the baths can only be handled with difficulty because of their strongly corrosive properties.

Now we have found a process for the after-treatment of phosphatized metal surfaces in order to improve their protection against corrosion in which the disadvantages of the process described above are avoided and which comprises treating the phosphatized metal surfaces with a solution containing monomeric alkene phosphonic acid, preferably vinyl phosphonic acid, and at least one macromolecular substance of vinyl phosphonic acid and/or polymers free from phosphorus which contain acid groups, and subsequently drying the metal surfaces thus treated.

As monomeric alkene phosphonic acids there are preferably used those containing two or three carbon atoms, i.e. vinyl phosphonic acid ($CH_2=CHPO_3H_2$), propene phosphonic acid (propene-1,2-phosphonic-1-acid, $CH_3CH=CHPO_3H_2$), and allyl phosphonic acid (propene-phosphonic-1-acid, $CH_2=CHCH_2PO_3H_2$).

As macromolecular substances of vinyl phosphonic acid there are used in accordance with the invention homopolymers of vinyl phosphonic acid and/or copolymers of vinyl phosphonic acid and/or copolymers of acid derivatives of vinyl phosphonic acid which contain, per monomer unit, only one free hydroxyl group at the phosphorus atom.

The copolymers used in the present process are advantageously copolymers of vinyl phosphonic acid and/or an acid derivative of vinyl phosphonic acid which contains only one free hydroxyl group at the phosphorous atom per monomer unit and which are advantageously the semi-esters of vinyl phosphonic acid with a mono- or polyunsaturated organic compound having a substantially polar character, for example acrylic acid, methacrylic acid, and the esters of such acids with aliphatic alcohols containing 1 to 5 carbon atoms, the amides and nitriles of such acids and vinyl esters as, for example, vinyl acetate and vinyl propionate, and also maleic acid anhydride and crotonic acid.

There may also be used copolymers of vinyl phosphonic acid that are built up from at least three monomers, for example, from vinyl phosphonic acid, acrylic acid and maleic anhydride or crotonic acid.

As polymer components for the after-treatment solutions there have, according to the invention, also proved to be useful two or several of said homopolymers and/or copolymers The most suitable ratio of alkene phosphonic acid to the polymer in the solutions used depends essentially on the particular polymer component used. According to the invention it has been found, however, that generally even solutions containing less than 10% by weight of polymer bring about a good protection against corrosion of the metal surfaces treated.

It has been found that solutions containing a total of as little as about 0.001 to about 3% by weight of alkene phosphonic acid and polymer have proved to be useful. It is suitable, however, to use for the after-treatment of phosphate coatings solutions containing alkene phosphonic acid and polymer within a range of concentration of about 0.008 to about 2% by weight.

As solvents for the alkene phosphonic acid and the polymers, there may be used water or aliphatic alcohols containing 1 to 4 carbon atoms in the molecule, preferably isopropanol, or mixtures of water and the said aliphatic alcohols.

According to the present invention it has also been found to be advantageous to use a solution which contains a wetting agent in addition to the alkene phosphonic acid and the polymer. As such wetting agents, commercially available products may be used in the usual concentrations when water or a mixture of water and organic solvents in which the predominant part is water are used.

The process according to the invention is advantageously carried out in such a way that the phosphatized metal parts are treated with the after-treatment solutions described above for a short time ranging from a few seconds to several minutes, for example, about 3 seconds to about 3 minutes, at a temperature of about 4° C. to about 70° C., preferably about 15° C. to about 25° C., and subsequently dried at about 80° C. to about 200° C., preferably 120° C. to 150° C. The drying depends primarily on the solvent or the solvent mixture used. The phosphatized metal parts can be treated in the usual manner, for example, by spraying, immersion or flooding.

The present invention also provides the solutions for carrying out the process, the said solutions containing alkene phosphonic acid, preferably vinyl phosphonic acid and polyvinyl phosphonic acid and/or an acid derivative thereof which contains only one free hydroxyl group at the phosphorus atom per monomer unit, preferably a semi-ester thereof and/or a copolymer or vinyl phosphonic acid and/or an acid derivative thereof and/or polymers free from phosphorus which contain acid groups, preferably polyacrylic acid and/or a copolymer of vinyl alkyl ethers and maleic anhydride, dissolved in water and/or alcohols. Other components of the copolymers of polyvinyl phosphonic acid and/or an acid derivative thereof may be organic compounds containing one or more olefinic bonds, especially acrylic acid, methacrylic acid and the esters, amides and nitriles thereof as well as vinyl esters, maleic anhydride and crotonic acid.

The use of the compositions of polymers and alkene phosphonic acid according to the invention has, above all, considerable economic advantages. Thus, these compositions may also contain polymers which, alone, would not provide sufficient protection for the metal surfaces. For example, polyacrylic acid of copolymers of vinyl alkyl ethers and maleic anhydride may be suitably incorporated into the compositions of the present invention. When using the polymers or copolymers prepared in solution which contain alkene phosphonic acid or an acid derivative thereof, it is not necessary—for example, in order to operate more economically—to wait till the polymerization has ceased and to isolate the polymer by suitable precipitants. There may, with good results, also be used only partially polymerized concentrates, i.e. also concentrates containing only a small quantity of polymer in addition to the monomer. The solutions according to the invention can, of course, also be obtained directly by dissolving the individual components, i. e. the monomeric product and the polymer obtained, for example, by precipitation polymerization, in the respective solvent or solvent mixture. It is, moreover, possible by choosing suitable polymers, to adapt the efficiency of the after-treatment solutions with respect to corrosion protection to the individual practical requirements.

As compared with the solutions containing chromic acid which are frequently applied in industry for the after-treatment of phosphate coatings, the solutions containing alkene phosphonic acid and a polymer according to the invention have, inter alia, the advantage that the waste water can be treated in an easy manner which brings about a considerable economy of the process. While chromic acid solutions, owing to the toxicity of the chromium compounds, must first be reduced and the trivalent chromium compounds obtained in this operation must then be removed quantitatively from the waste water, tests showed that solutions containing together 0.03% by weight of vinyl phosphonic acid and polyvinyl phosphonic acid, for example have no detrimental action on fish.

Extensive tests have shown, moreover, that the attack of the acid on the after-treated phosphate coatings which takes place even at room temperature is much less when using the solutions according to the invention than in the case, for example, of commercial chromic acid solutions having the same concentration. Thus in commercial after-treatment solutions which have a content of about 0.05% by weight of chromic acid, about 0.2 g./sq. m. of zinc phosphate are removed within a treatment time of 15 seconds, and about 0.3 g./sq. m. of zinc phosphate are removed in the case of an immersion time of 30 seconds. When using according to the invention solutions of vinyl phosphonic acid and polyvinyl phosphonic acid with the same total concentration (0.05% by weight), the respective values are 0.015 g./sq. m. or 0.02 g./sq. m. of zinc phosphate that has been removed.

The following examples serve to illustrate the invention but they are not intended to limit it thereto:

*Example 1*

Steel plates (of class ST VII) were treated for 10 minutes at 98° C. with a commercially available degreasing agent, the pH of which was adjusted to the alkaline range, and then rinsed with cold water. The steel plates were then coated for 10 minutes at 60° C. with a well adhering light-gray layer of zinc-phosphate in a commercially available 35 points phosphatizing bath which contained, moreover, an oxidizing accelerator. After rinsing with cold water, which may also be dispensed with, the phosphatized steel plates were immersed for 10 seconds at a temperature of about 20° C. in a solution containing per liter of water 0.4 g. of vinyl phosphonic acid and 0.1 g. of a copolymer of vinyl phosphonic acid and acrylic acid (ratio of vinyl phosphonic acid:acrylic acid=80:20 by weight respectively) which had been prepared by suspension polymerization, and subsequently dried in the drying closet at 150° C. for 5 minutes.

For the purpose of comparison, some of the steel plates that had been degreased and phosphatized in the manner described above, were immersed for 30 seconds in a commercially available after-treatment solution containing about 0.3 g./l. of chromic acid in addition to small amounts of phosphoric acid, and likewise dried in the drying closet for 5 minutes at 150° C.

The plates after-treated according to the two different processes were then coated with an alkyd resin baking varnish in two stages (primer and enamel) at a baking temperature of 145° C., the baking time amounting to 25 minutes in each case, an subjected to the various usual corrosion and varnish adhesion tests.

It was found that the test samples, both those after-treated according to the invention and those after-treated with a solution containing chromic acid and phosphoric acid, have excellent test values. Phosphatized steel plates that have not been after-treated, however, only possess an inferior protection aganist corrosion; their test values are poor. Of the many solutions that were tested and which lead to the same good results under the same conditions, if not stated otherwise, only the following shall be mentioned:

(a) 0.4 g. of vinyl phosphonic acid and 0.1 g. of a commercially available copolymer of vinyl methyl ether and maleic anhydride dissolved in 1000 g. of water, time of immersion 5 sec., (b) 1.5 g. of vinyl phosphonic acid and 1.5 g. of commercially available polyacrylic acid dissolved in 1000 g. of water, (c) 0.5 g. of vinyl phosphonic acid and 0.1 g. of a copolymer of vinyl phosphonic acid and vinyl acetate (molar ratio 1:1) dissolved in 1000 g. of water with the addition of a wetting agent, time of immersion 5 sec., bath temperature about 16° C., (d) 2 g. of vinyl phophonic acid and 8 g. of polyvinyl phosphonic acid dissolved in 1000 g. of water, time of immersion 15 sec., bath temperature about 4° C., (e) 0.2 g. of vinyl phosphonic acid and 0.1 g. of a copolymer of vinyl phosphonic acid and methacrylic acid (molar ratio 1.2:1) dissolved in 1000 g. of water, time of immersion 3 minutes, (f) 0.8 g. of vinyl phosphonic acid and 0.1 g. of a copolymer of methyl acrylate and vinyl phosphonic acid (molar ratio 1:3.2) dissolved in 1000 g. of water, time of immersion 20 sec., (g) 1 g. of vinyl phosphonic acid and 0.17 g. of a copolymer of vinyl phosphonic acid monoethyl ester and vinyl acetate (molar ratio 1:1) dissolved in 1000 g. of water, time of immersion 15 sec., (h) 0.2 g. of propene phosphonic acid and 0.3 g. of polyvinyl phosphonic acid dissolved in 1000 g. of water, (i) 0.8 g. of allyl phosphonic acid and 0.2 g. of polyvinyl phosphonic acid dissolved in 1000 g. of water, time of immersion 15 sec., (k) 3 g. of vinyl phosphonic acid and 0.1 g. of polyvinyl phosphonic acid with the addition of a wetting agent, (l) 4.1 g. of vinyl phosphonic acid and 0.1 g. of a copolymer of vinyl phosphonic acid and acrylic acid (molar ratio 6.3:1), time of immersion 5 sec., bath temperature 8° C., (m) 0.4 g. of vinyl phosphonic acid and 0.3 g. of a copolymer of vinyl phosphonic acid and acrylic acid (molar ratio 1:1.28), time of immersion 20 sec.

*Example 2*

Steel plates of class ST VIII) were degreased in the manner as described in Example 1 and coated with a layer of zinc phosphate at 60° C. The plates were then, without intermediate rinsing, after-treated for 20 seconds with a solution of vinyl phosphonic acid and polyvinyl phosphonic acid having a temperature of 60° C. The after-treatment solution was prepared in the following manner:

After the addition of a usual oxidation agent as catalyst, a 35% solution of vinyl phosphonic acid in isopropanol was heated at a temperature of about 80° C. for about 30 minutes. Analysis methods that had been developed expressly for this purpose showed that, in the course of this operation, approximately 20% of the vinyl phosphonic acid applied was polymerized into polyvinyl phosphonic acid. This polymerization solution was then diluted with water to give a solution of 0.1% by weight of vinyl phosphonic acid and polyvinyl phosphonic acid. The steel plates after treated with this solution were dried for 3 minutes at a temperature of about 120° C. and coated with an alkyd resin baking varnish as indicated in Example 1. When subjected to the usual corrosion and varnish adhesion tests, they had excellent test values.

*Example 3*

Steel plates (of class ST VII), after being degressed as described in Example 1 and rinsed with cold water, were coated for 10 minutes at 90° C. with a well adhering, dark layer of manganese phosphate in a commercial 33 point phosphatizing bath which contained, moreover, an oxidizing accelerator and small amounts of polyphosphate. The test samples were then treated for 30 seconds with an aqueous solution of 0.55 g./l. of vinyl phosphonic acid and 0.25 g./l. of polyvinyl phosphonic acid which had been obtained by suspension polymerization, which solution contained in addition small amounts of a commercially available wetting agent, and subjected to a heat treatment for 5 minutes at 125° C. The steel plates which had subsequently been sprayed with a commercially available oil exhibited an excellent protection against corrosion.

We claim:

1. A process for improving the corrosion protection of phosphatized metal surfaces, which process comprises after-treating said phosphatized metal surfaces at a temperature from about 4° C. to about 70° C. for a period of from about 3 seconds to about 3 minutes with a solution containing a total of from about 0.008 percent by weight to about 2 percent by weight of at least one alkene phosphonic acid selected from the group consisting of vinyl phosphonic acid, propene-2,3-phosphonic-1-acid and propene-1,2-phosphonic-1-acid, and of at least one polymer selected from the group consisting of polyvinyl phosphonic acid, copolymers of vinyl phosphonic acid, copolymers of an acid derivative of vinyl phosphonic acid which derivative contains only one free hydroxyl group at the phosphorus atom per monomer unit, polyacrylic acid, and a copolymer of vinyl methyl ether and maleic anhydride, the comonomeric component of said copolymers of vinyl phosphonic acid and of said copolymers of said acid derivative of vinyl phosphonic acid comprising at least one substance selected from the group consisting of acrylic acid, acrylic acid alkyl esters, methacrylic acid, vinyl acetate, and acrylonitrile, the weight ratio of said monomeric alkene phosphonic acid to said polymer being between 98:2 and 20:80, and finally drying said metal surfaces.

2. A process as claimed in claim 1, wherein said solution contains water as a solvent.

3. A process as claimed in claim 2, wherein said solution contains in addition an aliphatic alcohol containing 1 to 4 carbon atoms.

4. A process as claimed in claim 1, wherein said solution additionally contains a non-ionogenic wetting agent.

5. A composition for after-treating phosphatized metal surfaces to improve their corrosion protection, which composition comprises an aqueous solution containing a total of from about 0.008 percent by weight to about 2 percent by weight of at least one alkene phosphonic acid selected from the group consisting of vinyl phosphonic acid, propene-2,3-phosphonic-1-acid, and propene-1,2-phosphonic-1-acid, and of at least one polymer selected from the group consisting of polyvinyl phosphonic acid, copolymers of vinyl phosphonic acid, copolymers of an acid derivative of vinyl phosphonic acid which derivative contains only one free hydroxyl group at the phosphorus atom per monomer unit, polyacrylic acid, and a copolymer of vinyl methyl ether and maleic anhydride, the comonomeric component of said copolymers of vinyl phosphonic acid and of said copolymers of said acid derivative of vinyl phosphonic acid comprising at least one substance selected from the group consisting of acrylic acid, acrylic acid alkyl esters, methacrylic acid, vinyl acetate, and a crylonitrile, the weight ratio of said monomeric alkene phosphonic acid to said polymer being between 98:2 and 20:80.

6. A composition as claimed in claim 5, in which the solution additionally contains an aliphatic alcohol containing 1 to 4 carbon atoms.

7. A composition as claimed in claim 5, in which said solution additionally contains a non-ionogenic wetting agent.

References Cited by the Examiner

UNITED STATES PATENTS

| | | | |
|---|---|---|---|
| 2,311,306 | 2/43 | Ritchey | 148—6.14 |
| 2,766,153 | 10/56 | Russell | 148—6.15 |
| 2,885,312 | 5/59 | McDonald | 148—6.15 |

RICHARD D. NEVIUS, *Primary Examiner.*

MARCUS U. LYONS, *Examiner.*